(12) United States Patent
Tuchler et al.

(10) Patent No.: US 6,980,969 B1
(45) Date of Patent: Dec. 27, 2005

(54) METHODS AND APPARATUS FOR ALLOWING INTERNET BASED PURCHASES BASED ON A TEMPORARY CREDIT CARD NUMBER

(75) Inventors: James Tuchler, Northbrook, IL (US); Andrew Crowe, Naperville, IL (US)

(73) Assignee: Sears, Roebuck and Co., Hoffman Estates, IL (US)

( * ) Notice: Subject to any disclaimer, the term of this patent is extended or adjusted under 35 U.S.C. 154(b) by 755 days.

(21) Appl. No.: 09/713,868

(22) Filed: Nov. 16, 2000

(51) Int. Cl.[7] ............................................. G06F 17/60
(52) U.S. Cl. ............................. 705/39; 705/35; 705/38
(58) Field of Search .............................. 705/38, 43, 64, 705/35, 39

(56) References Cited

U.S. PATENT DOCUMENTS

| | | | |
|---|---|---|---|
| 4,567,359 A | 1/1986 | Lockwood | |
| 4,648,037 A | 3/1987 | Valentino | |
| 5,239,462 A | 8/1993 | Jones et al. | |
| 5,774,882 A | 6/1998 | Keen et al. | |
| 5,797,133 A | 8/1998 | Jones et al. | |
| 5,870,721 A | 2/1999 | Norris | |
| 5,940,811 A | 8/1999 | Norris | |
| 6,105,007 A | 8/2000 | Norris | |
| 6,422,462 B1 * | 7/2002 | Cohen | 38/102.6 |
| 6,456,984 B1 * | 9/2002 | Demoff et al. | 705/40 |
| 6,529,725 B1 * | 3/2003 | Joao et al. | 455/406 |
| 2001/0011246 A1 * | 8/2001 | Tammaro | 705/38 |
| 2002/0032662 A1 * | 3/2002 | Maclin et al. | 705/64 |
| 2002/0069170 A1 * | 6/2002 | Rizzo et al. | 705/43 |
| 2002/0120587 A1 * | 8/2002 | D'Agostino | 705/78 |
| 2003/0028481 A1 * | 2/2003 | Filcroft et al. | 705/39 |

FOREIGN PATENT DOCUMENTS

WO      WO/16415    *   7/1994       G07F 7/10

OTHER PUBLICATIONS

"AmEx to offer 'disposable' credit card numbers", (visited Sep. 7, 2000), <http://news.cnet.com/news/0-1007-202-2716407.html>.

* cited by examiner

Primary Examiner—Jagdish N Patel
(74) Attorney, Agent, or Firm—Gary R. Jarosik

(57) ABSTRACT

The system described herein allows a user to apply for a credit card on-line. If an electronic application is approved, a temporary credit card number is issued on-line for immediate use. The temporary credit card number may be used to purchase goods and/or services on-line until at least one of a plurality of deactivation conditions is detected. Deactivation conditions may include time limits expiring, the reception of certain messages from a client device, and/or purchasing limits being exceeded. If a deactivation condition is found, the temporary credit card number is deactivated. Purchase requests associated with a particular temporary credit card number are approved or denied based on the current activation status of the temporary credit card number and/or the purchasing history associated with the temporary credit card number.

8 Claims, 16 Drawing Sheets

- BY SUBMITTING THIS APPLICATION ELECTRONICALLY, YOU AGREE THAT YOUR TYPED NAME WILL SERVE AS YOUR SIGNATURE ON THE APPLICATION.

IMPORTANT SEARS CREDIT CARD TERMS

The information below includes the costs associated with a Sears Card account issued by Sears National Bank (SNB). The information is accurate as of (10/18/2000), but may change after that date. The information is updated daily. If you are unable to access this web site at a later date and wish to find out what may have changed, write to: National Account Authorization Center, 13200 Smith Road, Middleburg Heights, OH 44130-7802.

| Annual fees | None |
|---|---|
| Annual percentage rate for purchases | Sears Card Account: 21.00%, or 24.00% if at any time you fail to make the required minimum monthly payment for two consecutive billing cycles.* |
| Grace period for repayment of balances for purchases | Not less than 20 days. |
| Method of computing the balance for purchases | Average daily balance (including new purchases). |
| Minimum finance charge | $0.50 for each billing period in which a finance charge is due. |
| Late payment fee | $25 on balances of $50 or greater; $10 on balances of less than $50 |

*Once applied, this rate will be in effect until you make the minimum monthly payment on time for six consecutive cycles.

California residents only: A married applicant may apply for a separate account. For joint accounts, after credit approval, each applicant shall have the right to use this account to the extent of any credit limit set by the creditor, and each applicant may be liable for all amounts of credit extended under this account to any joint applicant.

METHODS AND APPARATUS FOR ALLOWING INTERNET BASED PURCHASES BASED ON A TEMPORARY CREDIT CARD NUMBER

TECHNICAL FIELD OF THE INVENTION

The present invention relates in general to purchasing goods and services on-line and, in particular, to methods and apparatus for allowing Internet enabled purchases based on a temporary credit card number.

BACKGROUND

The number of people and the number of dollars involved with on-line purchasing is increasing at a rapid pace. Typically, customers use a traditional credit card number to pay for goods and services purchased on-line. However, traditional credit card purchases in an on-line environment have certain drawbacks.

First, not everyone has a traditional credit card number to use on-line. Applying for a credit card often involves several cumbersome steps including obtaining a form, mailing the form, and waiting several days for a credit card number. This process discourages many people from making spur of the moment purchases.

In addition, on-line credit card use raises a number of security issues. If someone discovers a user's credit card number, the user may be liable for a certain amount of wrongful purchases, and he is faced with the inconvenience of canceling the credit card and obtaining a new credit card. The credit card issuer is also burdened by a compromised credit card number. The issuer is typically liable for the majority of the wrongful purchases, and the issuer's overhead increases when cards must be reissued.

BRIEF DESCRIPTION OF THE DRAWINGS

Features and advantages of the present invention will be apparent to those of ordinary skill in the art in view of the detailed description of exemplary embodiments which is made with reference to the drawings, a brief description of which is provided below.

FIGS. 10–15 are a series of screen-shots of an exemplary web page providing an electronic credit card application.

FIG. 16 is a screen-shot of an exemplary web page inviting a user to pay for goods on-line using the temporary credit card number or inviting the user to apply for a credit card on-line.

DETAILED DESCRIPTION OF EXEMPLARY EMBODIMENTS

In general, the system described herein allows a user to apply for a credit card on-line. If an electronic application is approved, a temporary credit card number is issued on-line for immediate use. The temporary credit card number may be used to purchase goods and/or services on-line until one of a plurality of deactivation conditions is detected. Deactivation conditions may include time limits expiring, the reception of certain messages from a client device, and/or purchasing limits being exceeded. If a deactivation condition occurs, the temporary credit card number is deactivated. Purchase requests associated with a particular temporary credit card number are approved or denied based on the current activation status of the temporary credit card number and/or the purchasing history associated with the temporary credit card number.

Figure 1:
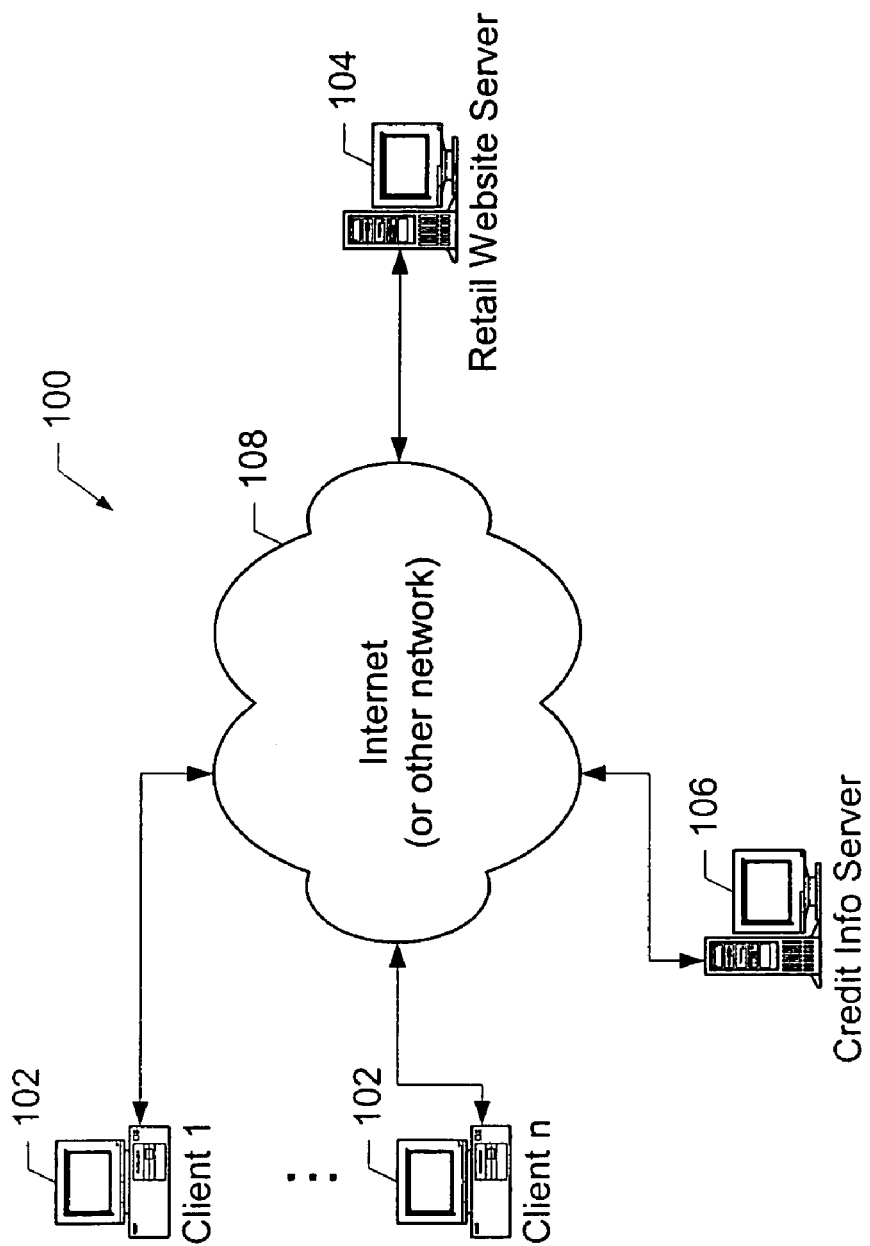
FIG. 1 is a high level block diagram of a communications system.

A high level block diagram of an exemplary communications system 100 capable of employing the teachings of the present invention is illustrated in FIG. 1. Typically, the system 100 includes one or more client devices 102, one or more retail website servers 104, and optionally one or more credit information servers 106. Each of these devices may communicate with each other via a connection to the Internet or some other wide area network 108.

Typically, retail website servers 104 store a plurality of files, programs, and/or web pages for use by the client devices 102. One retail website server 104 may handle requests from a large number of clients 102. Similarly, a credit information server 106 may handle a large number of requests from a retail website server 104. Accordingly, each server 104, 106 is typically a high end computer with a large storage capacity, one or more fast microprocessors, and one or more high speed network connections. Conversely, relative to a typical server 104, 106, each client device 102 typically includes less storage capacity, a single microprocessor, and a single network connection.

Figure 2:
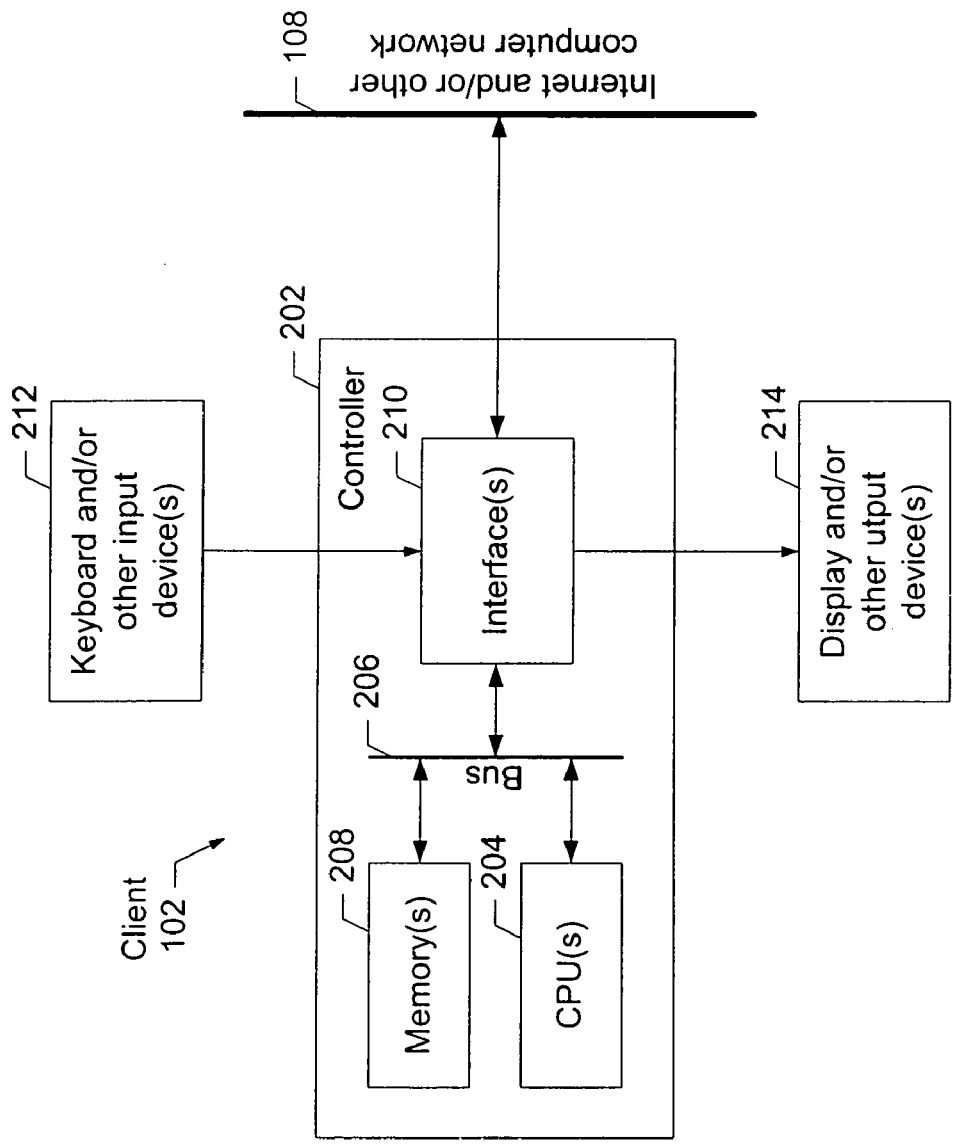
FIG. 2 is a more detailed block diagram of one of the client devices illustrated in FIG. 1.

A more detailed block diagram of a client device 102 is illustrated in FIG. 2. The client 102 includes a controller 202 which preferably includes a central processing unit 204 electrically coupled by an address/data bus 206 to a memory device 208 and an interface circuit 210. The CPU 204 may be any type of well known CPU, such as an Intel Pentium™ processor. The memory device 208 preferably includes volatile memory and non-volatile memory. Preferably, the memory device 208 stores a software program that interacts with the retail website server 104 as described below. This program may be executed by the CPU 204 in a well known manner. The memory device 208 may also store digital data indicative of documents, files, programs, web pages, etc. retrieved from a server 104, 106 and/or loaded via an input device 212.

The interface circuit 210 may be implemented using any type of well known interface standard, such as an Ethernet interface and/or a Universal Serial Bus (USB) interface. One or more input devices 212 may be connected to the interface circuit 210 for entering data and commands into the controller 202. For example, the input device 212 may be a keyboard, mouse, touch screen, track pad, track ball, isopoint, and/or a voice recognition system.

One or more displays, printers, and/or other output devices 214 may also be connected to the controller 202 via the interface circuit 210. The display 214 may be cathode ray tube (CRTs), liquid crystal displays (LCDs), or any other type of display. The display 214 generates visual displays of data generated during operation of the client 102. The display 214 is typically used to display web pages received from the retail website server 104. The visual displays may include prompts for human operator input, run time statistics, calculated values, detected data, etc.

The client 102 may also exchange data with other devices via a connection to the network 108. The network connection may be any type of network connection, such as an Ethernet connection, digital subscriber line (DSL), telephone line, coaxial cable, etc. Users of the system 100 may be required to register with a retail website server 104. In such an instance, each user may choose a user identifier and a password which may be required for the activation of services. The user identifier and password may be passed across the Internet using encryption built into the user's browser. Alternatively, the user identifier and/or password may be assigned by the retail website server 104.

Figure 3:
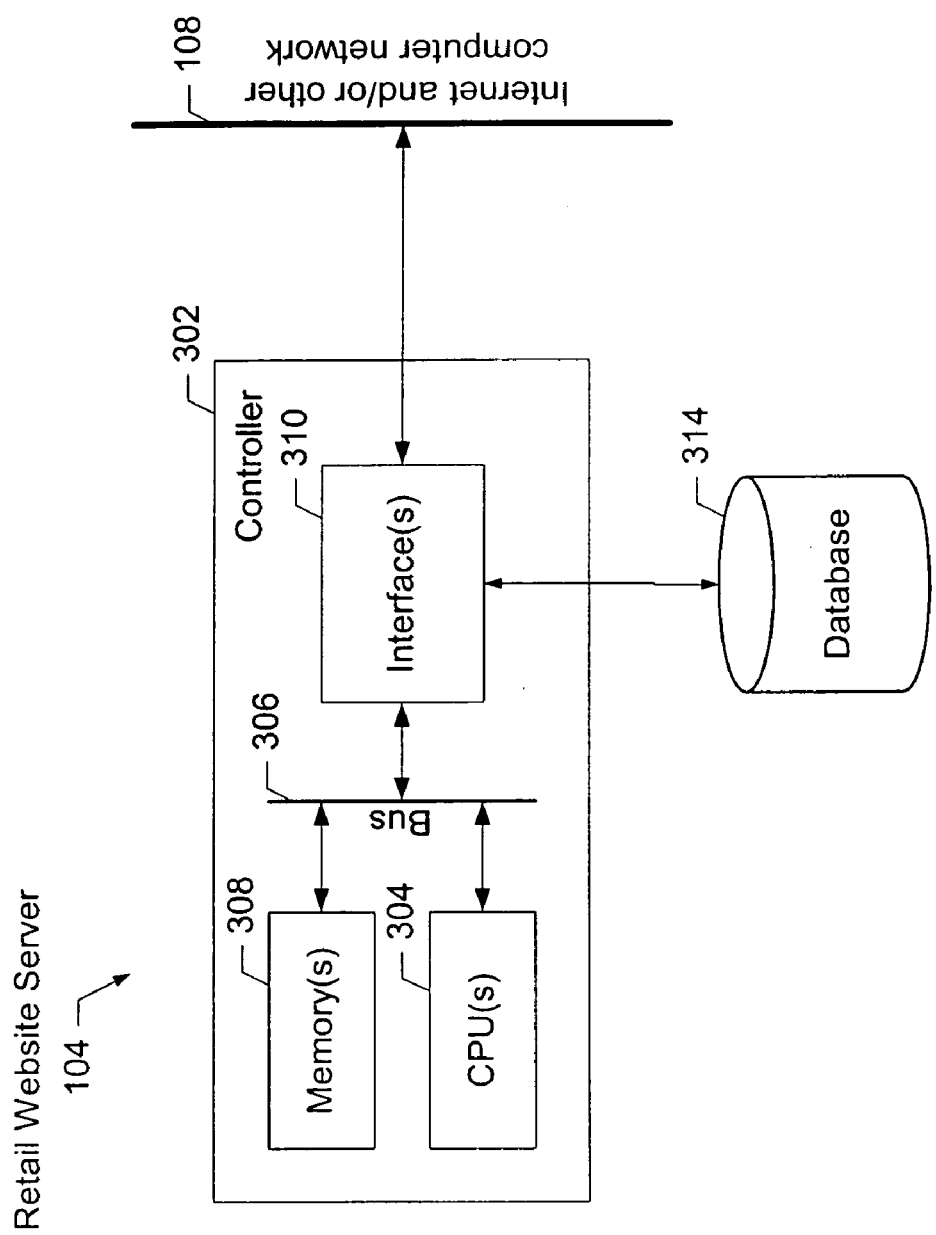
FIG. 3 is a more detailed block diagram showing one embodiment of the retail website server illustrated in FIG. 1.

A more detailed block diagram of a retail website server 104 is illustrated in FIG. 3. Like the client device 102, the controller 302 in the server 104 preferably includes a central processing unit 304 electrically coupled by an address/data bus 306 to a memory device 308 and a network interface circuit 310. However, the sever server controller 302 is typically more powerful than the client controller 202. Again, the CPU 304 may be any type of well known CPU, such as an Intel Pentium™ processor, and the memory device 308 preferably includes volatile memory and non-volatile memory. Preferably, the memory device 308 stores a software program that implements all or part of the method described below. This program may be executed by the CPU 304 in a well known manner. However, some of the steps described in the method below may be performed manually or without the use of the server 104. The memory device 308 and/or a separate database 314 also store files, programs, web pages, etc. for use by the client devices 102.

The server 104 may exchange data with other devices via a connection to the network 108. The network interface circuit 310 may be implemented using any data transceiver, such as an Ethernet transceiver. The network 108 may be any type of network, such as a local area network (LAN) and/or the Internet.

Figure 4:
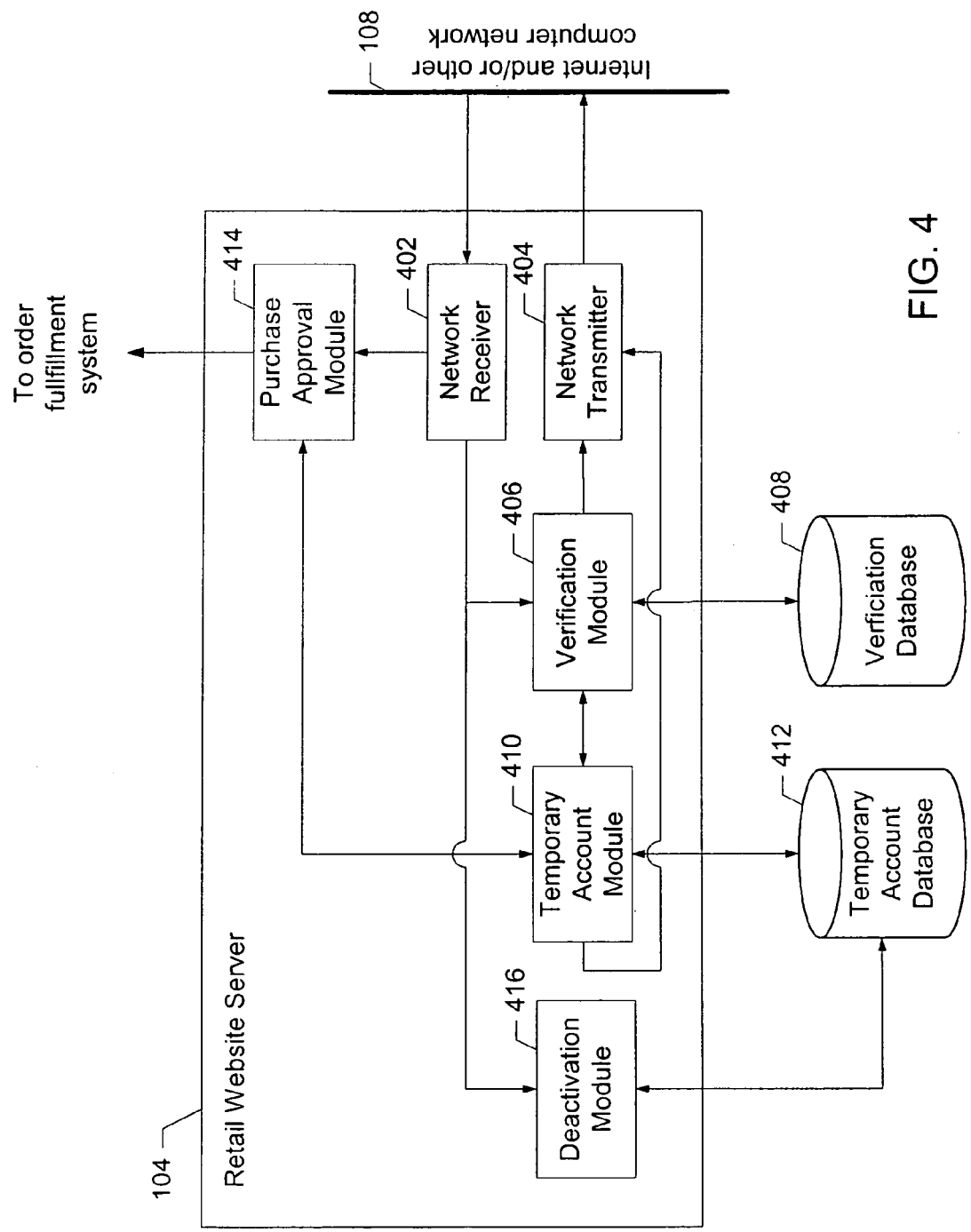
FIG. 4 is a more detailed block diagram showing another embodiment of the retail website server illustrated in FIG. 1.

A more detailed block diagram of another embodiment of the retail website server 104 is illustrated in FIG. 4. In this embodiment, the retail website server 104 includes a plurality of interconnected modules 402–416. Each of the modules may be implemented by a microprocessor executing software instructions and/or conventional electronic circuitry. In addition, a person of ordinary skill in the art will readily appreciate that certain modules may be combined or divided according to customary design constraints.

For the purpose of transmitting web pages, credit card application data, credit verification requests, credit card numbers, and other data, the retail website server 104 includes a network transmitter 404. The network transmitter 404 is operatively coupled to the network 108 in a well known manner. For example, the network transmitter 404 may also be an Ethernet interface circuit electrically coupled to the Internet via an Ethernet cable.

For the purpose of transmitting web pages, credit card application data, credit verification requests, credit card numbers, and other data, the retail website server 104 includes a network transmitter 404. The network transmitter 404 is operatively coupled to the network 108 in a well know manner. For example, the network transmitter 404 may also be an Ethernet interface circuit electrically coupled to the Internet via an Ethernet cable.

For the purpose of determining if a particular user should be awarded a temporary credit card number and/or a conventional credit card, the retail website server 104 includes a verification module 406 and a verification database 408. Preferably, this determination is based on applicant data, such as name, address, etc. received by the network receiver 402. Accordingly, the verification module 406 is operatively coupled to the network receiver 402, and the verification database 408 is in communication with the verification module 406. In operation, the verification module 406 queries the verification database 408 to determine if the applicant data received by the receiver 402 is valid and if the user associated with the applicant data is a credit risk. Alternatively, the verification module 406 may query the credit information server 106 via the network 108 to determine if the applicant data is valid and if the user associated with the applicant data is a credit risk.

For the purpose of determining a temporary credit card number, the retail website server 104 includes a temporary account module 410 and a temporary account database 412. Preferably, the temporary account database 412 contains a list of active temporary credit card numbers and inactive temporary credit card numbers. Each active number is typically associated with selected applicant data. In addition, the temporary account database 412 may contain traditional credit card information logically associated with the temporary credit card information. For example, in order to affect an account transfer, the temporary account module 410 may associate an outstanding balance incurred using a temporary credit card number with a traditional credit card number.

Preferably, the temporary account module 410 is in communication with the verification module 406 and the temporary account database 412. If the verification module 406 approves the user for credit, the temporary account module 410 queries the temporary account database 412 to determine a temporary credit card number. The temporary credit card number is preferably a unique number among a plurality of currently active temporary credit card numbers.

For the purpose of approving and rejecting user purchase requests, the retail website server 104 includes a purchase approval module 414. When a purchase request which includes a temporary credit card number is received by the receiver 402, the purchase approval module 414 checks with the temporary account module 410 to determine if the temporary credit card number is active. If the purchase approval module 414 approves the purchase request, a message is preferably sent to a traditional order fulfillment system (not shown).

For the purpose of deactivating temporary credit card numbers, the retail website server 104 includes a deactivation module 416. The deactivation module 416 accesses the temporary account database 412 to change the status of a temporary credit card number from active to inactive if one or more conditions occur. For example, the deactivation module 416 may expire a temporary credit card number in response to a predetermined time period elapsing. The time period may be a fixed time period, such as forty-five minutes from issuing the temporary credit card number, or the time period may be a dynamic time period, such as forty-five minutes of user inactivity. User inactivity may be determined at the client device 102, or user inactivity may be based on a lack of network messages at the retail website server 104.

In addition, the deactivation module 416 may deactivate a temporary credit card number in response to receiving a request for a predetermined web page from the client device 102. For example, if a user leaves the website associated with the retail website server 104 and then returns to the website by requesting the site's "home page," the deactivation module 416 may be configured to deactivate the temporary credit card number associated with that user. Still further, the deactivation module 416 may deactivate a temporary credit card number in response to receiving a message indicative of a browser shut down from the client device 102 or in response to the client device 102 failing to respond to a communication request from the retail server 104.

Yet further, the deactivation module 416 may deactivate a temporary credit card number in response to (i) a predetermined number of purchase transactions being made using the temporary credit card number,
  (ii) a predetermined dollar amount of purchases being made using the temporary credit card number, and/or
  (iii) a predetermined number of items being purchased using the temporary credit card number. Deactivated credit card numbers may be reactivated. For example, if a customer who has not spent above a certain dollar threshold returns to the retail web site 104 within a certain time period, the retailer may allow further purchases to be made using the temporary credit card number.

Figure 5:
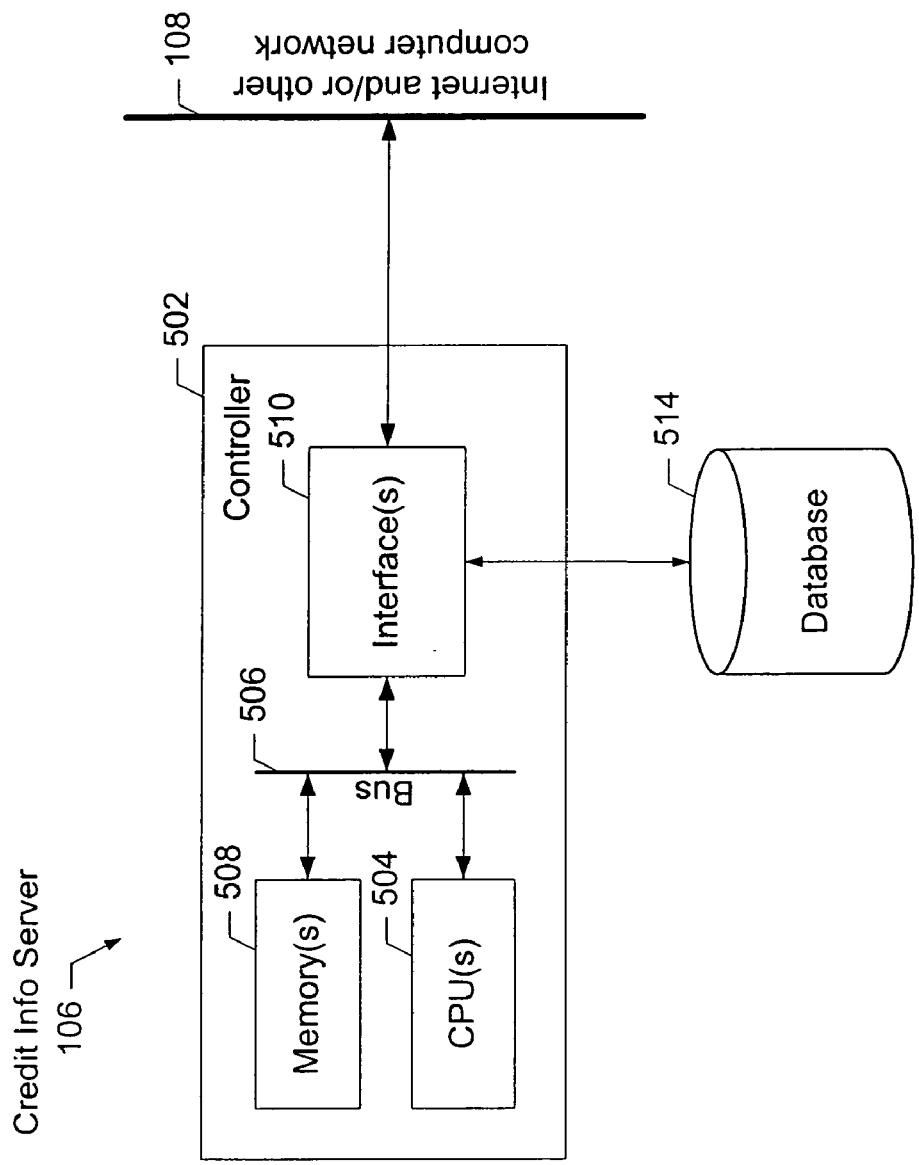
FIG. 5 is a more detailed block diagram of the credit information server illustrated in FIG. 1.

A more detailed block diagram of a credit information server 106 is illustrated in FIG. 5. Like the retail website server 104, the controller 502 in the credit information server 106 preferably includes a central processing unit 504 electrically coupled by an address/data bus 506 to a memory device 508 and a network interface circuit 510. Again, the CPU 504 may be any type of well known CPU, such as an Intel Pentium™ processor, and the memory device 508 preferably includes volatile memory and non-volatile memory. Preferably, the memory device 508 stores a software program that may implement all or part of the method described below. This program may be executed by the CPU 504 in a well known manner. However, some of the steps described in the method below may be performed manually or without the use of the server 106. The memory device 508 and/or a separate database 514 also store credit information which may be used by the retail website server 104. The credit information server 106 may exchange data with other devices, such as the retail website server 104, via a connection to the network 108. The network interface circuit 510 may be implemented using any data transceiver, such as an Ethernet transceiver.

Figure 6:
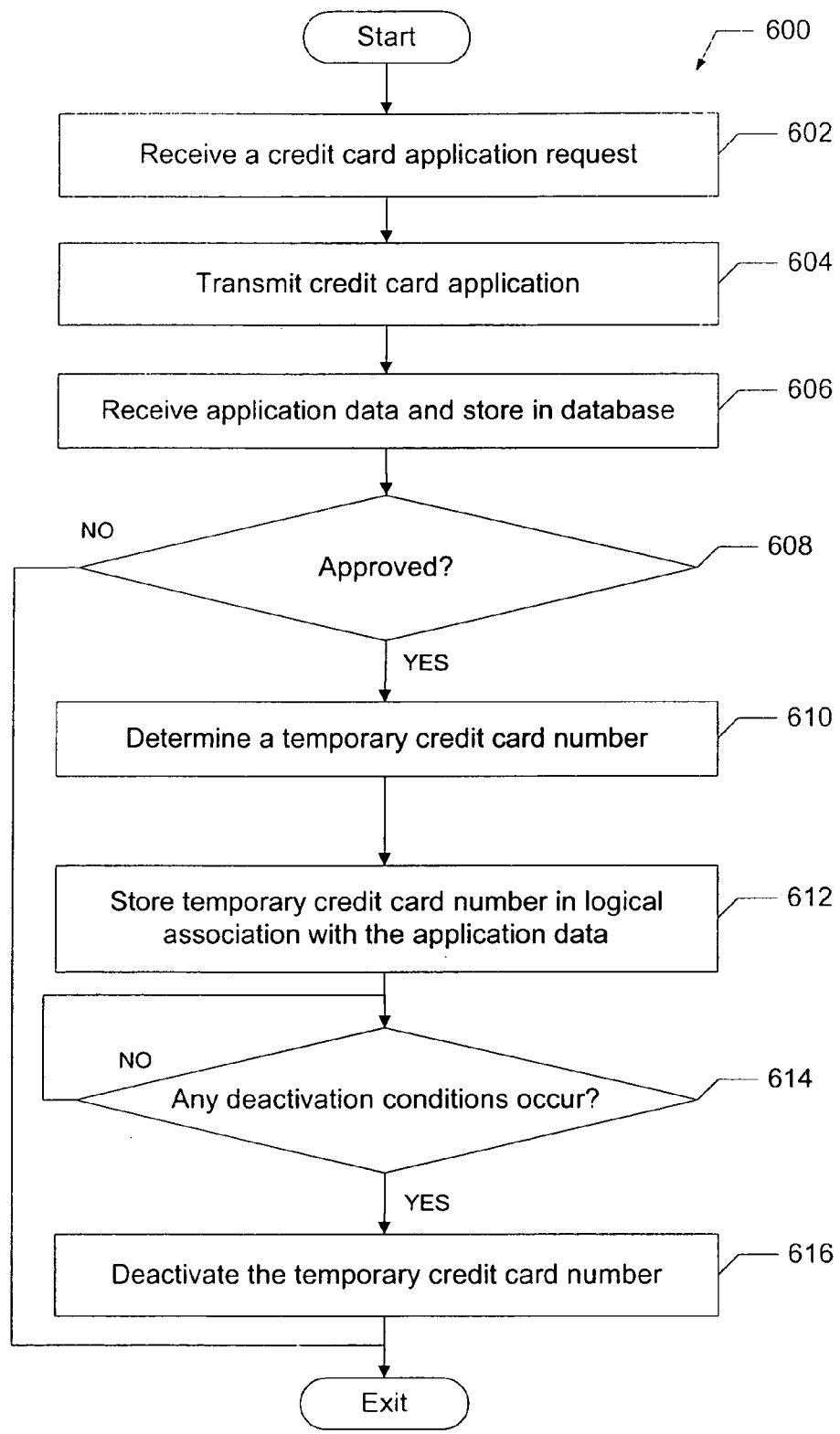
FIG. 6 is a flowchart of a process for establishing and maintaining a temporary credit card number.

A flowchart of a process 600 for establishing and maintaining a temporary credit card number is illustrated in FIG. 6. Preferably, the process 600 is embodied in a software program which is stored in the retail website server memory 308 and executed by the server CPU 304 in a well known manner. However, some or all of the steps of the process 600 may be performed manually and/or by another device. Although the process 600 is described with reference to the flowchart illustrated in FIG. 6, a person of ordinary skill in the art will readily appreciate that many other methods of performing the acts associated with process 600 may be used. For example, the order of many of the steps may be changed without departing from the scope or spirit of the present invention.

Generally, the process 600 allows a user to apply for a credit card on-line. If the application is approved, a temporary credit card number is issued on-line for immediate use. The temporary credit card number may be used to purchase goods and services on-line until one of a plurality of deactivation conditions is detected.

Figure 9:
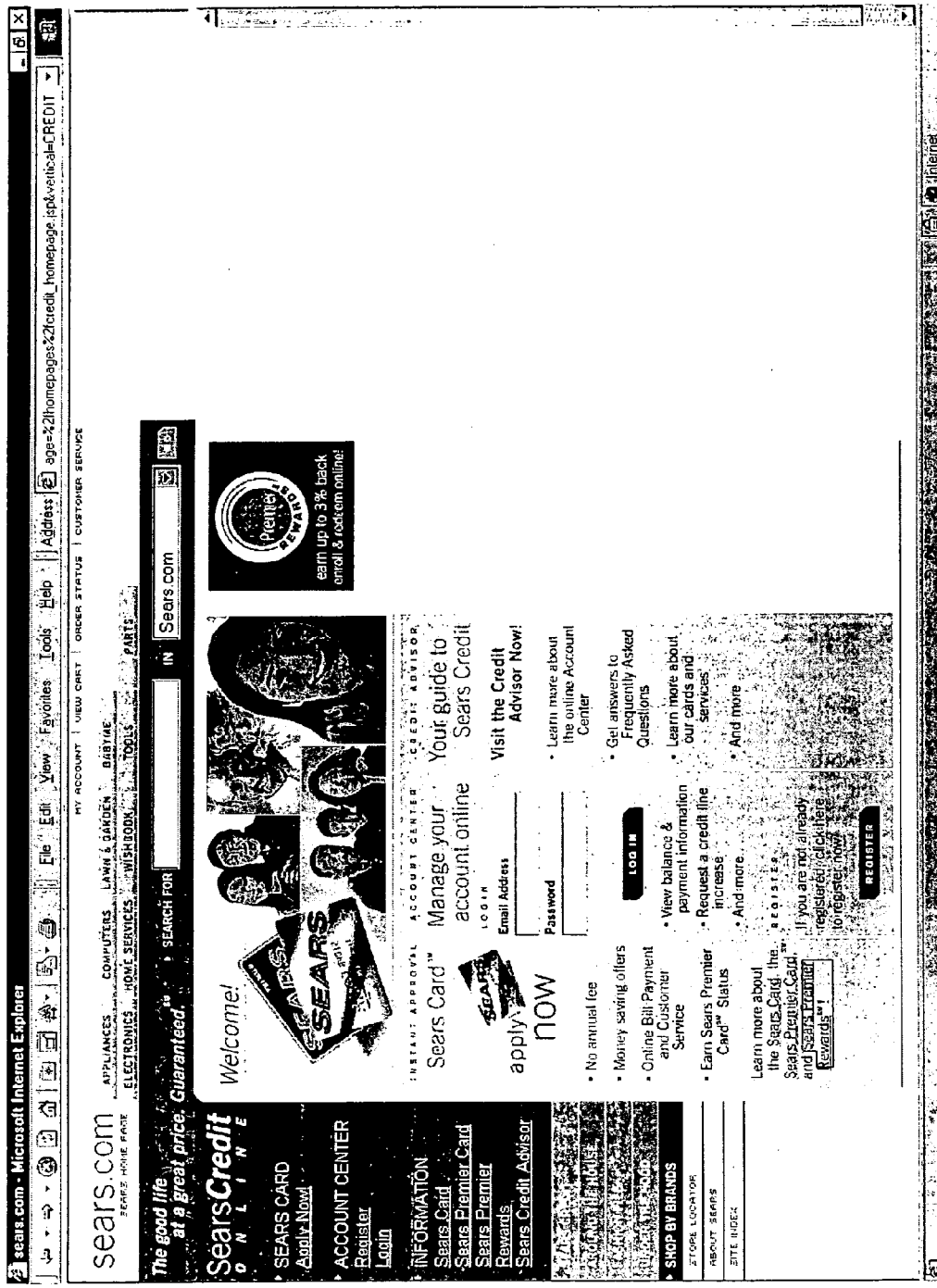
FIG. 9 is a screen-shot of an exemplary web page inviting a user to apply for a credit card on-line.
Figure 10:
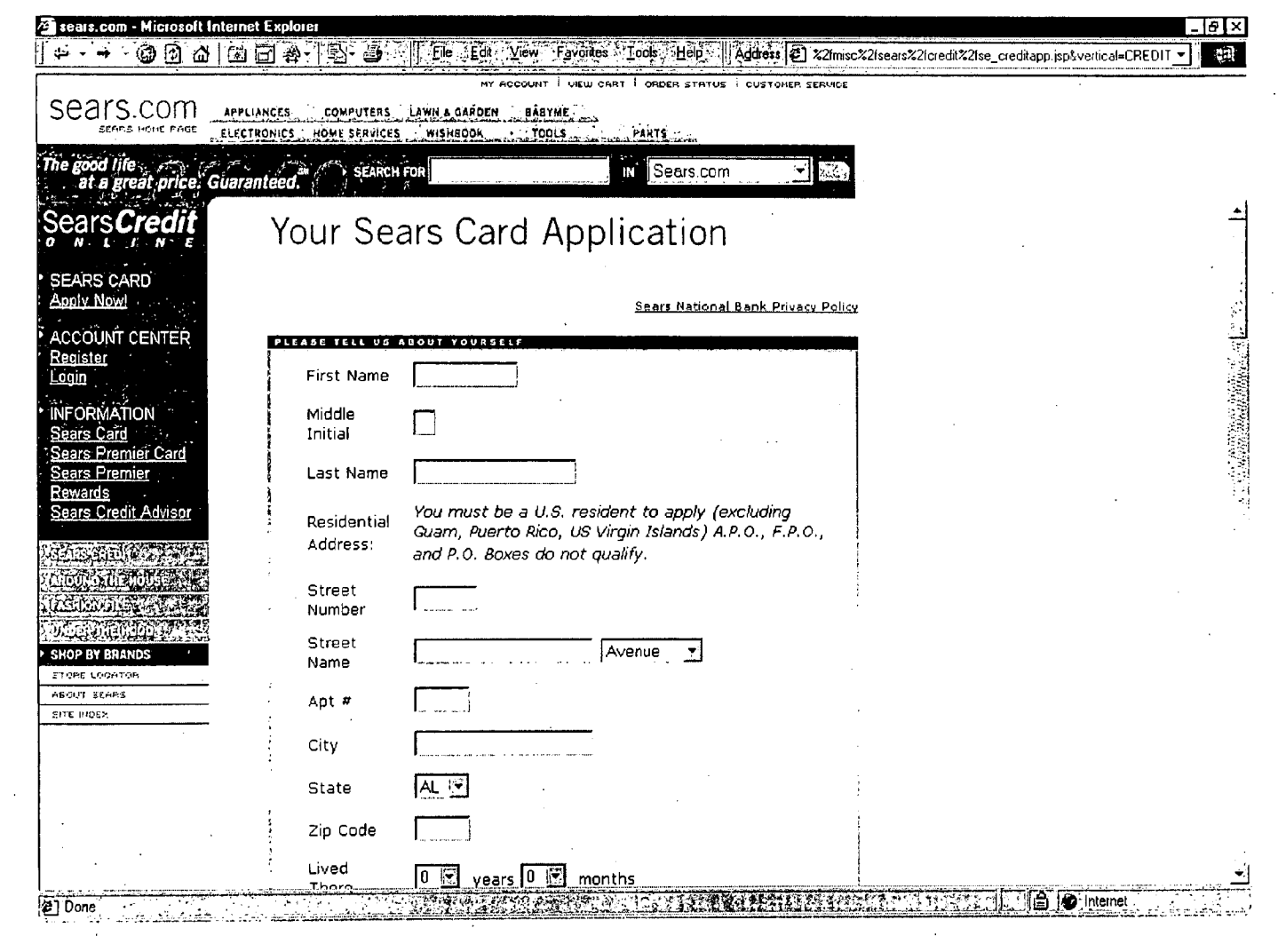
Figure 11:
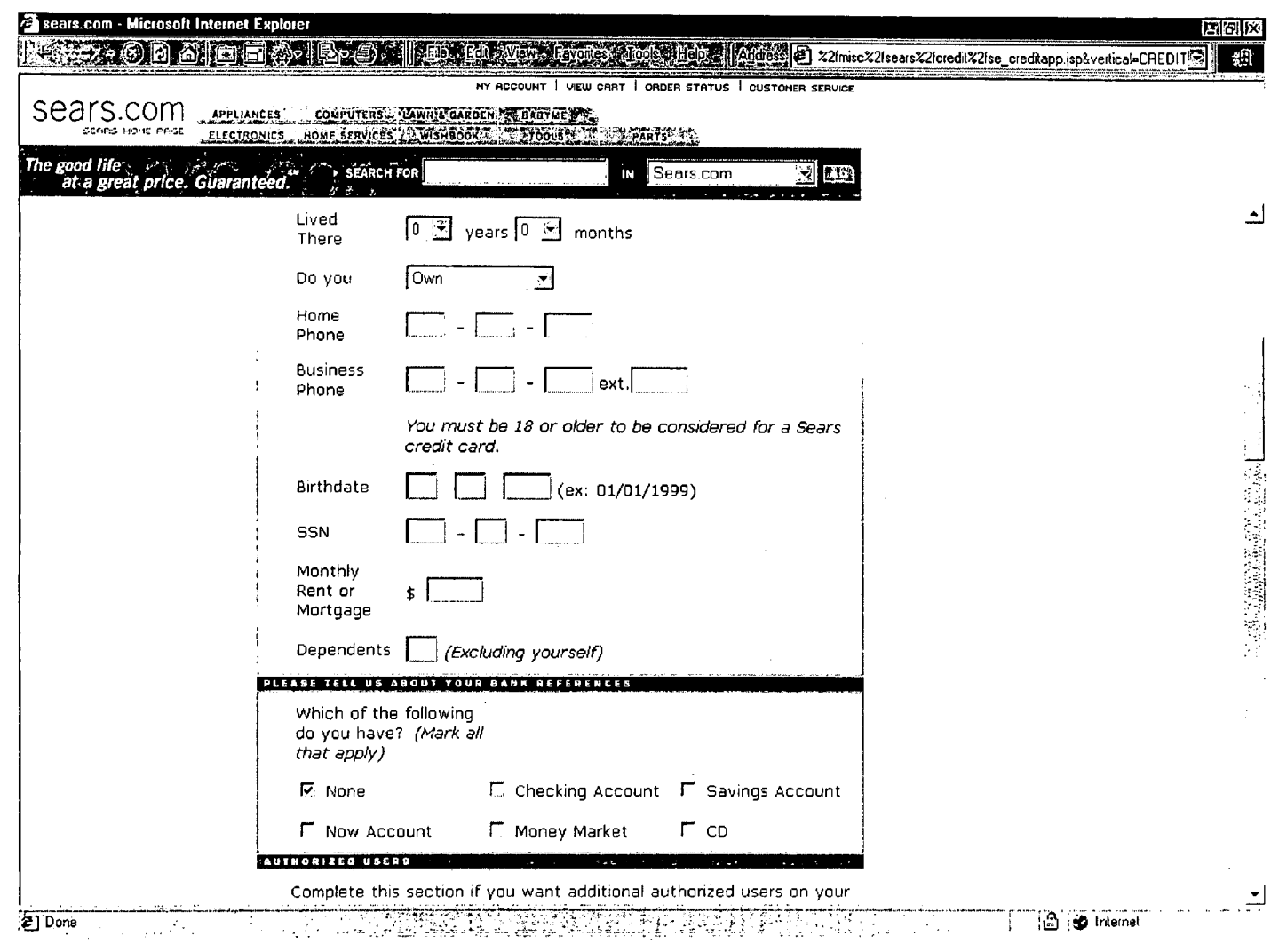
Figure 12:
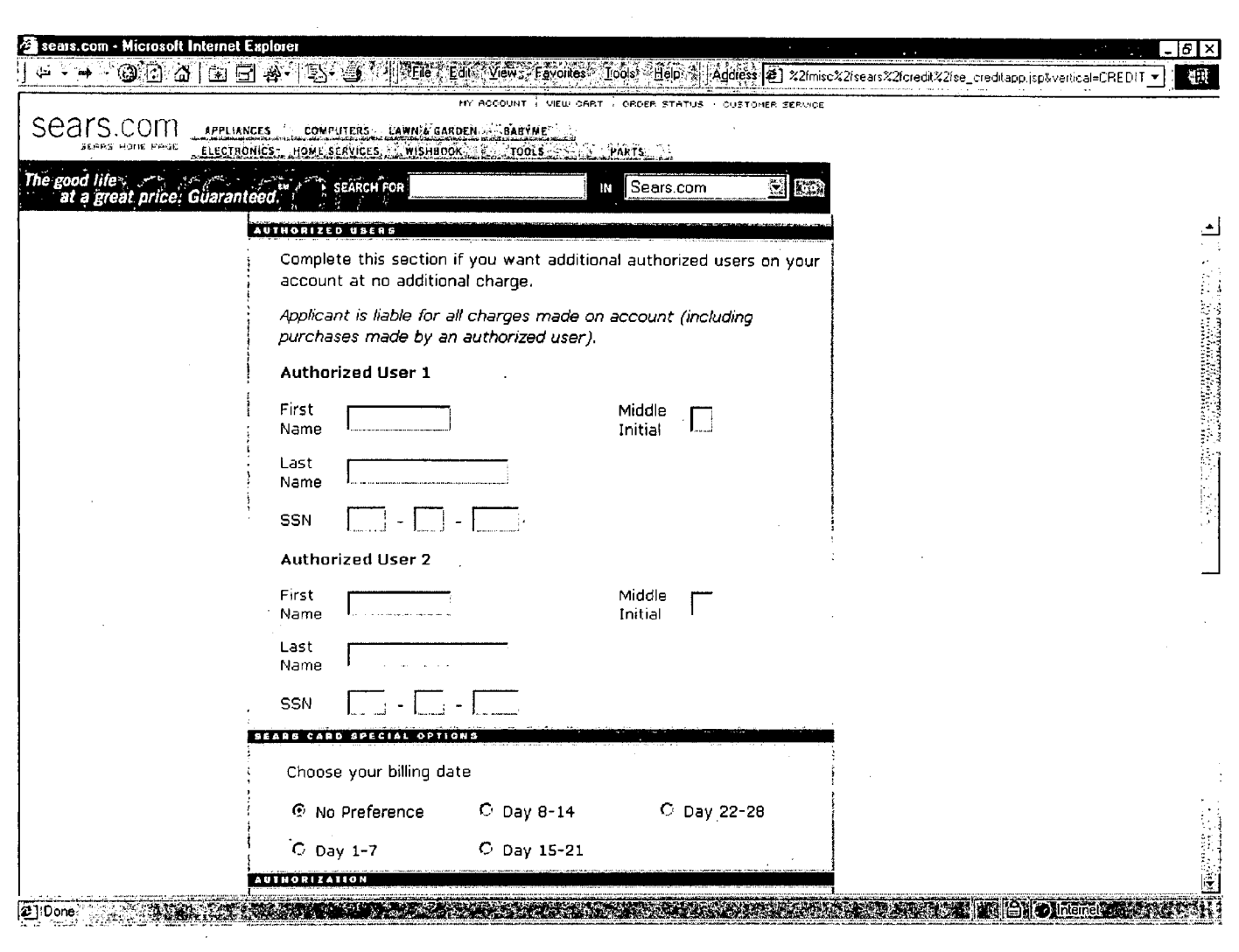
Figure 13:
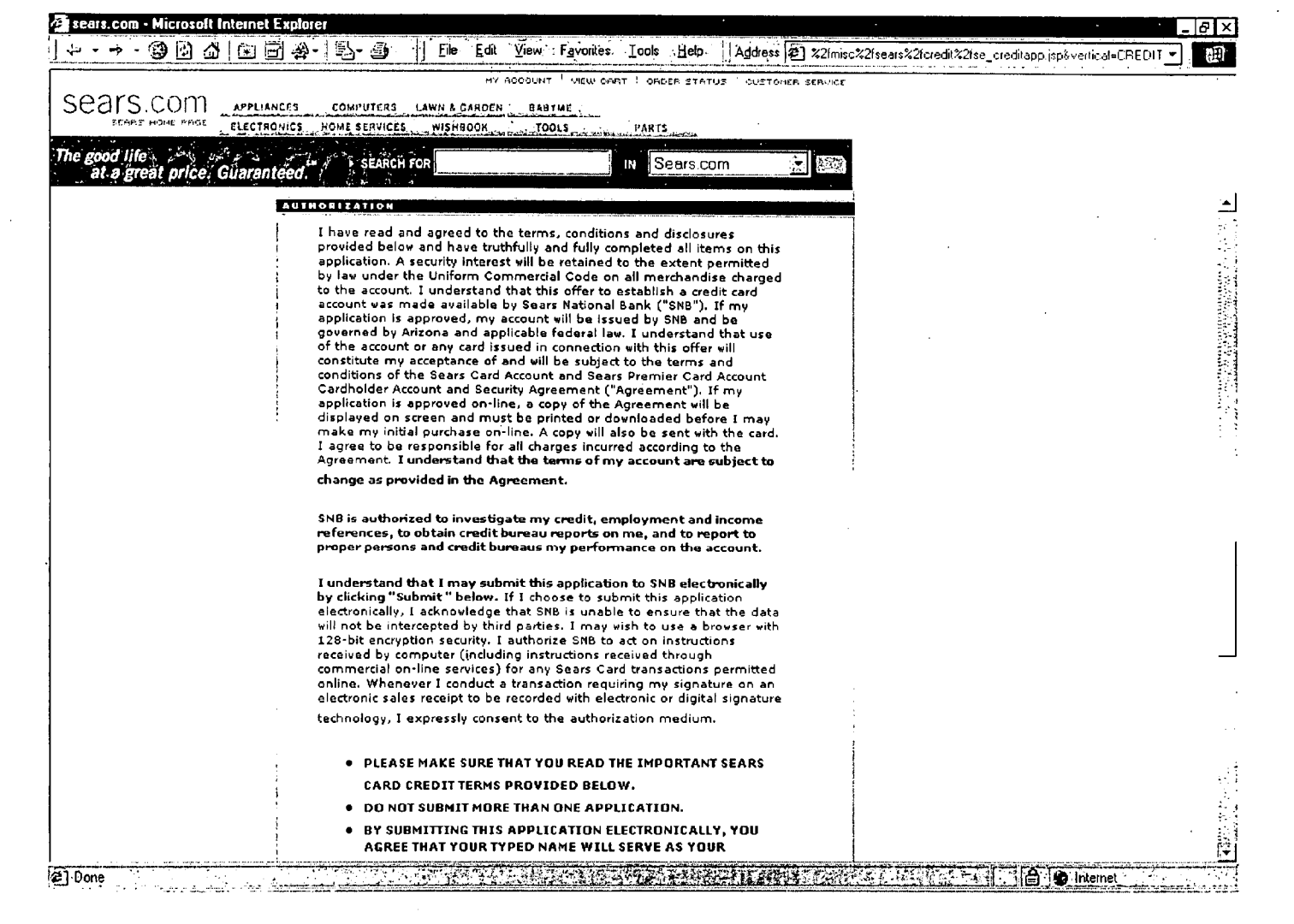
Figure 15:
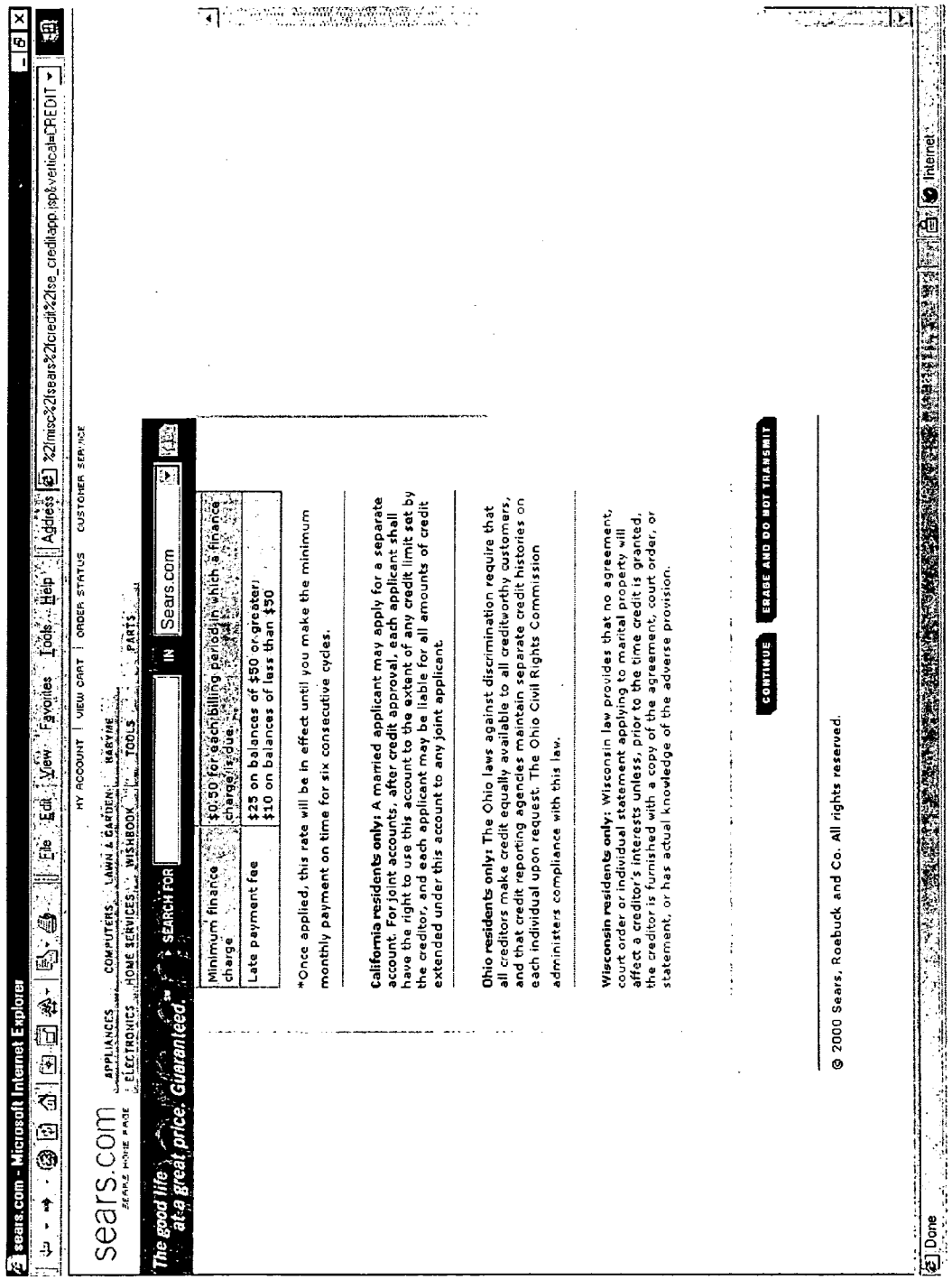

The process 600 begins when a request for an on-line credit card application is received (step 602). Preferably, the credit card application request is a web page request received at the retail website server 104. See FIG. 9 for a screen-shot of an exemplary web page inviting a user to apply for a credit card on-line. Subsequently, the process 600 transmits a "blank" application form to the requesting client device 102 (step 604). The "blank" application form is preferably a web page with field labels and data entry boxes. See FIGS. 10–15 for a series of screen-shots of an exemplary web page providing an electronic credit card application. If the retail website server 104 is aware of certain data associated with the requesting user (e.g., cookie data and/or data previously stored in the database 314), the "blank" application form may arrive at the client device 102 with certain fields pre-filled. Preferably, the user fills out the application form and transmits the data back to the retail website server 104 (step 606).

The process 600 then checks the received applicant data against the verification database 408 and/or the credit information database 514 to determine if the user is approved for credit in a well known manner (step 608). If the applicant is not approved, the process 600 exits. If the applicant is approved, the process 600 determines a temporary credit card number (step 610). The temporary credit card number is preferably a unique number among a plurality of currently active temporary credit card numbers. In one embodiment, the temporary credit card number is randomly selected from a large number of previously unused temporary credit card numbers. For example, if the temporary credit card number is a sixteen digit number, a random sixteen digit number may be generated in a well known manner. Preferably, the new number is checked for validity before activation (e.g., if the generated number has been used in the past, a new number is generated, etc.)

Once a temporary credit card number is determined, the number is stored with the application data (step 612). Preferably, the temporary credit card number and the application data are stored in the temporary account database 412. However, the temporary credit card number and/or the application data may be stored in the client memory 208, retail website server memory 104, and/or the retail website server database 314. The process 600 then waits for one or more deactivation conditions to occur (step 614) and deactivates the temporary credit card number when such a condition is detected (step 616).

Figure 7:
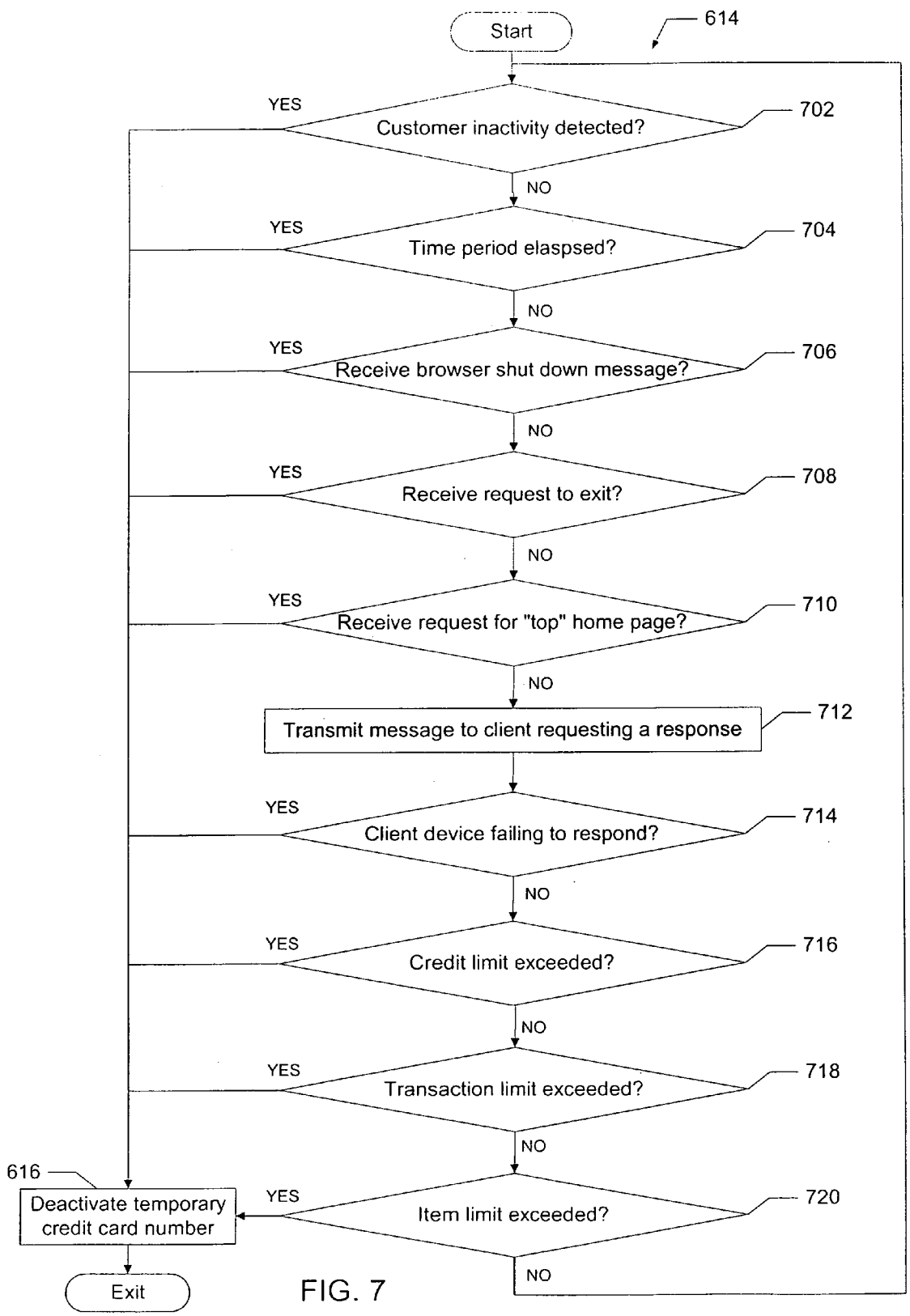
FIG. 7 is a more detailed flowchart of the deactivation step illustrated in FIG. 6.

A more detailed flowchart of an exemplary deactivation process 614 is illustrated in FIG. 7. Preferably, the process 614 is embodied in a software program which is stored in the retail website server memory 308 and executed by the server CPU 304 in a well known manner. However, some or all of the steps of the process 614 may be performed manually and/or by another device. Although the process 614 is described with reference to the flowchart illustrated in FIG. 7, a person of ordinary skill in the art will readily appreciate that many other methods of performing the acts associated with process 614 may be used. For example, the order of many of the steps may be changed without departing from the scope or spirit of the present invention. In addition, many of the steps described are optional.

Generally, the process 614 loops through a series of checks to determine if the temporary credit card number should be deactivated. Conditions may include time limits expiring, the reception of certain messages from the client device 102 associated with the temporary credit card number, and/or purchasing limits being exceeded. If one or more of the conditions are found, the process 600 deactivates the temporary credit card number (step 616).

The process 614 begins by checking certain timers, such as a timer associated with user activity (step 702). For example, if the retail website server 104 does not receive a web page request from the client device 102 for forty-five minutes, the temporary credit card number may be deactivated (step 616). In addition, an overall time period may be checked (step 704). For example, the temporary credit card number may only be usable for one day.

The process 614 may also check for certain messages. For example, if the user shuts down his browser, the process 614 may detect a message indicative of the shutdown (step 706) and deactivate the temporary credit card number in response (step 616). Similarly, the process 614 may look for an "exit" or "log off" message when the user leaves the retail website (step 708). In addition, the process 614 may look for a "top page" request message if the user returns to the retail website (step 710).

In some circumstances, the client device 102 may not automatically send one of these termination messages. In such an instance, the process 614 may "ping" the client 102 by transmitting a message to the client 102 requesting a response (step 712). If the client 102 fails to respond within a certain time limit (step 714), the process 600 may deactivate the temporary credit card number (step 616).

The process 614 may also check if certain purchasing limits have been exceeded. For example, a credit limit may be checked (e.g., $500) (step 716). Similarly, a transaction limit (step 718) and/or an item limit (step 720) may be checked. For example, the temporary credit card number may only be used for five purchases (regardless of the number of items included in each purchase). Similarly, use of the temporary credit card number may be limited to e.g. ten items (regardless of how many purchase transactions occur).

Figure 8:
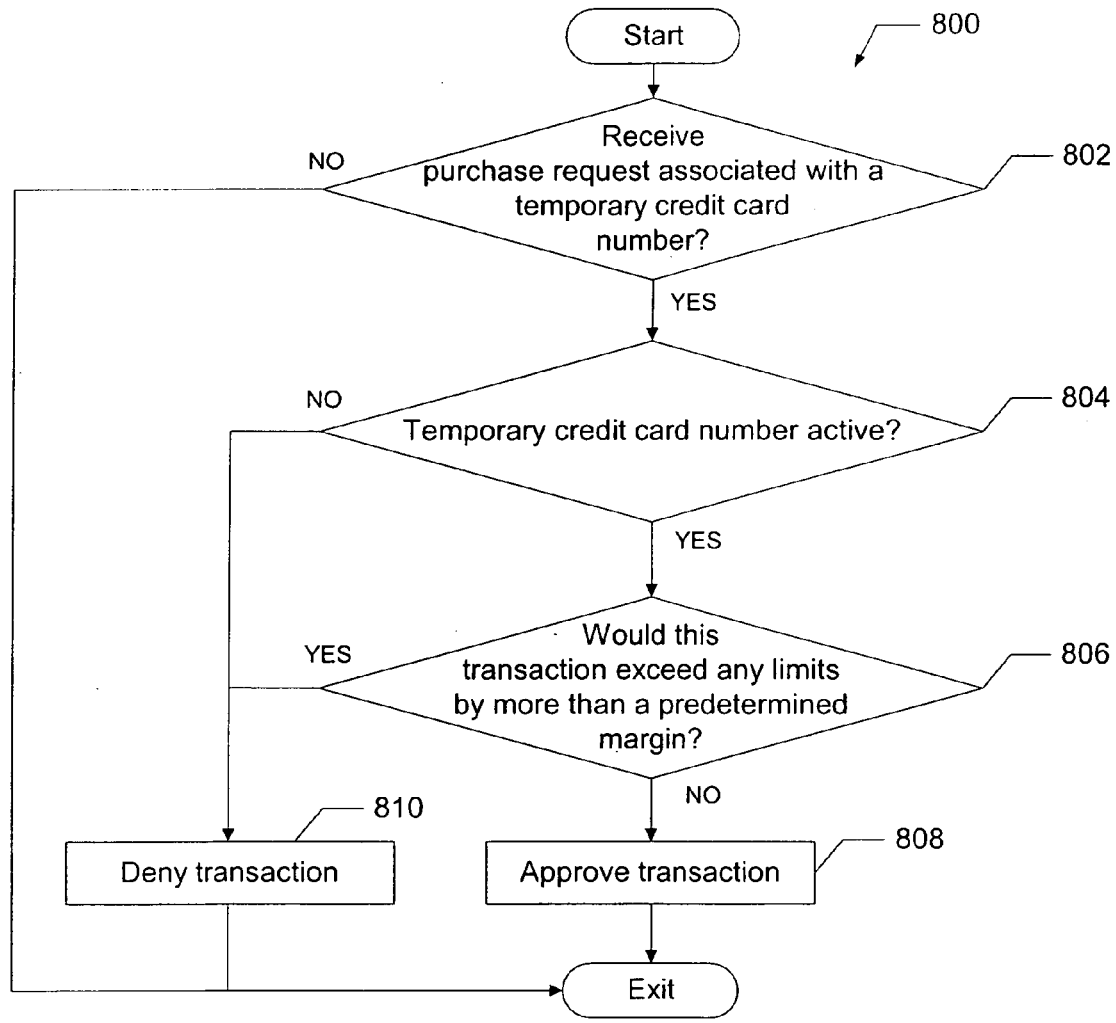
FIG. 8 is a flowchart of a process for authorizing on-line purchase requests associated with the temporary credit card number.

A flowchart of an exemplary process 800 for authorizing an on-line purchase request associated with the temporary credit card number is illustrated in FIG. 8. Preferably, the process 800 is embodied in a software program which is stored in the retail website server memory 308 and executed by the server CPU 304 in a well known manner. However, some or all of the steps of the process 614 may be performed manually and/or by another device. Although the process 800 is described with reference to the flowchart illustrated in FIG. 8, a person of ordinary skill in the art will readily appreciate that many other methods of performing the acts associated with process 800 may be used. For example, the order of many of the steps may be changed without departing from the scope or spirit of the present invention. In addition, many of the steps described are optional. Generally, the process 800 approves or denies a purchase request associated with a particular temporary credit card number based on the current status of the temporary credit card number and/or the purchasing history associated with the temporary credit card number.

Figure 16:
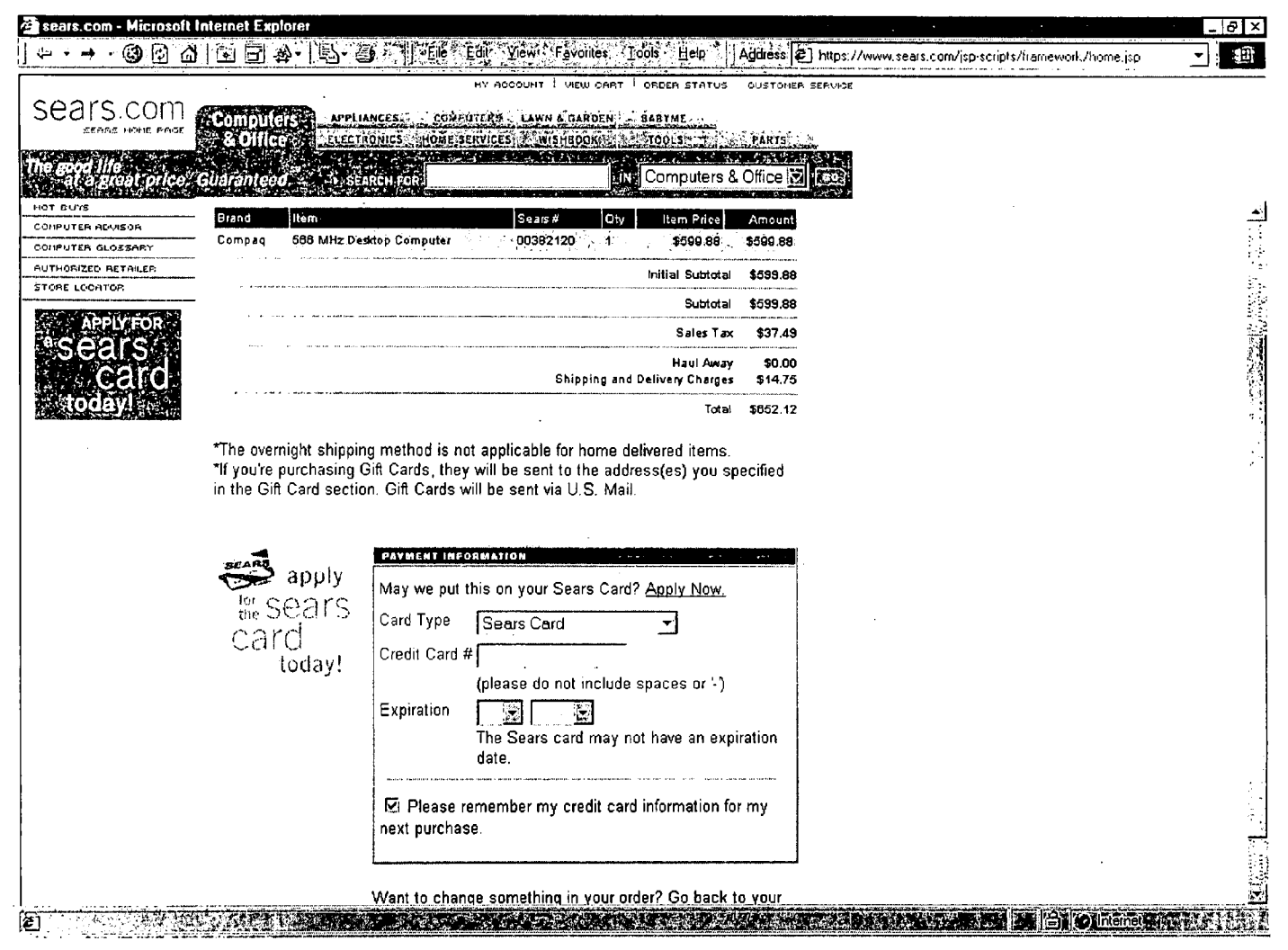

The process 800 begins by receiving a purchase request from a client device 102 (step 802). The purchase request may include a temporary credit card number, or the purchase request may be associated with a temporary credit card number by some other identifier. A screen-shot of an exemplary web page inviting a user to pay for goods on-line using the temporary credit card number (or inviting the user to apply for a credit card on-line) is illustrated in FIG. 16. If the purchase request includes and/or is associated with a temporary credit card number, the process 800 determines if the temporary credit card number is active (step 804). Preferably, the process 800 determines if the temporary credit card number is active by checking an associated status in the temporary account database 412 (or any other memory device). If the temporary credit card number is active, the process 800 may determine if the current pending transaction associated with the purchase request will exceed any purchasing limits by one or more predefined margins (step 806). If the temporary credit card number is active and no purchasing limits would be exceeded, the process 800 preferably approves the transaction (step 808). However, if the temporary credit card number is not active or a purchasing limit would be exceeded, the process 800 preferably denies the transaction (step 810).

In summary, persons of ordinary skill in the art will readily appreciate that methods and apparatus for allowing Internet based purchases based on a temporary credit card number have been provided. The disclosed retail website system benefits from a credit card system which provides immediate availability and increased security.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method for allowing a customer at an Internet client device to make Internet based purchases using a temporary credit card number, the method comprising the steps of:

during an Internet purchase transaction receiving a message indicative of a request to apply for a credit card account at an Internet server from the Internet client device via the Internet;

during the Internet purchase transaction transmitting data indicative of an electronic credit card account application from the Internet server to the Internet client device via the Internet;

during the Internet purchase transaction receiving the credit card account application at the Internet server from the client device via the Internet, the credit card account application including applicant data;

during the Internet purchase transaction storing the applicant data in a computer readable memory;

during the Internet purchase transaction verifying the applicant data against a verification database;

during the Internet purchase transaction, if the applicant data is verified, opening the credit card account and issuing a temporary credit card number associated with the credit card account, the temporary credit card number being unique among a plurality of currently active temporary credit card numbers stored in a temporary account database, the temporary credit card number available for immediate use, after opening the credit card account, as payment in the Internet purchase transaction;

allowing a plurality of additional Internet based purchases based on the temporary credit card number until the temporary credit card number is deactivated; and deactivating the temporary credit card number, wherein the step of deactivating the temporary credit card number comprises the step of expiring the temporary credit card number in response to a predetermined time period elapsing, and wherein the step of deactivating the temporary credit card number in response to a predetermined time period elapsing comprises the step of expiring the temporary credit card number in response to a predetermined time period of customer inactivity at a website elapsing.

2. A method for allowing a customer at an Internet client device to make Internet based purchases using a temporary credit card number, the method comprising the steps of:

during an Internet purchase transaction receiving a message indicative of a request to apply for a credit card account at an Internet server from the Internet client device via the Internet;

during the Internet purchase transaction transmitting data indicative of an electronic credit card account application from the Internet server to the Internet client device via the Internet;

during the Internet purchase transaction receiving the credit card account application at the Internet server from the client device via the Internet, the credit card account application including applicant data;

during the Internet purchase transaction storing the applicant data in a computer readable memory;

during the Internet purchase transaction verifying the applicant data against a verification database;

during the Internet purchase transaction, if the applicant data is verified, opening the credit card account and issuing a temporary credit card number associated with the credit card account, the temporary credit card number being unique among a plurality of currently active temporary credit card numbers stored in a temporary account database, the temporary credit card number available for immediate use, after opening the credit card account, as payment in the Internet purchase transaction;

allowing a plurality of additional Internet based purchases based on the temporary credit card number until the temporary credit card number is deactivated; and deactivating the temporary credit card number, wherein the step of deactivating the temporary credit card number comprises the step of deactivating the temporary credit card number in response to receiving a message indicative of a browser shut down from the Internet client device via the Internet.

3. A method for allowing a customer at an Internet client device to make Internet based purchases using a temporary credit card number, the method comprising the steps of:

during an Internet purchase transaction receiving a message indicative of a request to apply for a credit card account at an Internet server from the Internet client device via the Internet;

during the Internet purchase transaction transmitting data indicative of an electronic credit card account application from the Internet server to the Internet client device via the Internet;

during the Internet purchase transaction receiving the credit card account application at the Internet server from the client device via the Internet, the credit card account application including applicant data;

during the Internet purchase transaction storing the applicant data in a computer readable memory;

during the Internet purchase transaction verifying the applicant data against a verification database;

during the Internet purchase transaction, if the applicant data is verified, opening the credit card account and issuing a temporary credit card number associated with the credit card account, the temporary credit card number being unique among a plurality of currently active temporary credit card numbers stored in a temporary account database, the temporary credit card number available for immediate use, after opening the credit card account, as payment in the Internet purchase transaction;

allowing a plurality of additional Internet based purchases based on the temporary credit card number until the temporary credit card number is deactivated; and deactivating the temporary credit card number, wherein the step of deactivating the temporary credit card number comprises the step of deactivating the temporary credit card number in response to the Internet client device failing to respond to a communication request.

4. A method for allowing a customer at an Internet client device to make Internet based purchases using a temporary credit card number, the method comprising the steps of:

during an Internet purchase transaction receiving a message indicative of a request to apply for a credit card account at an Internet server from the Internet client device via the Internet;

during the Internet purchase transaction transmitting data indicative of an electronic credit card account application from the Internet server to the Internet client device via the Internet;

during the Internet purchase transaction receiving the credit card account application at the Internet server from the client device via the Internet, the credit card account application including applicant data;

during the Internet purchase transaction storing the applicant data in a computer readable memory;

during the Internet purchase transaction verifying the applicant data against a verification database;

during the Internet purchase transaction, if the applicant data is verified, opening the credit card account and issuing a temporary credit card number associated with the credit card account, the temporary credit card number being unique among a plurality of currently active temporary credit card numbers stored in a temporary account database, the temporary credit card number available for immediate use, after opening the credit card account, as payment in the Internet purchase transaction;

allowing a plurality of additional Internet based purchases based on the temporary credit card number until the temporary credit card number is deactivated; and deactivating the temporary credit card number, wherein the step of deactivating the temporary credit card number comprises the step of deactivating the temporary credit card number in response to a predetermined number of items being purchased using the temporary credit card number.

5. An apparatus for allowing a customer at an Internet client device to make Internet based purchases using a temporary credit card number, the apparatus comprising:

a network receiver operatively coupled to the Internet;

a network transmitter operatively coupled to the Internet;

a microprocessor in communication with the network receiver and the network transmitter; and a memory device in communication with the microprocessor, the memory device storing a software program capable of being executed by the microprocessor, the software program being structured to cause the microprocessor to:

receive a message indicative of a request to apply for a credit card account from the network receiver during an Internet purchase transaction;

transmit data indicative of an electronic credit card account application to the network transmitter during the Internet purchase transaction;

receive the application from the network receiver, the application including applicant data during the Internet purchase transaction;

verify the applicant data against a verification database during the Internet purchase transaction;

if the applicant data is verified during the Internet purchase transaction, open the credit card account and issue a temporary credit card number that is unique among a plurality of currently active temporary credit card numbers, the temporary credit card number available for immediate use, after opening the credit card account, as payment in the Internet purchase transaction;

allow a plurality of additional Internet based purchases based on the temporary credit card number until the temporary credit card number is deactivated; and deactivate the temporary credit card number, wherein the software program is structured to cause the microprocessor to deactivate the temporary credit card number in response to a predetermined time period of customer inactivity at a website elapsing.

6. An apparatus for allowing a customer at an Internet client device to make Internet based purchases using a temporary credit card number, the apparatus comprising:

a network receiver operatively coupled to the Internet;

a network transmitter operatively coupled to the Internet;

a microprocessor in communication with the network receiver and the network transmitter; and a memory device in communication with the microprocessor, the memory device storing a software program capable of being executed by the microprocessor, the software program being structured to cause the microprocessor to:

receive a message indicative of a request to apply for a credit card account from the network receiver during an Internet purchase transaction;

transmit data indicative of an electronic credit card account application to the network transmitter during the Internet purchase transaction;

receive the application from the network receiver, the application including applicant data during the Internet purchase transaction;

verify the applicant data against a verification database during the Internet purchase transaction;

if the applicant data is verified during the Internet purchase transaction, open the credit card account and issue a temporary credit card number that is unique among a plurality of currently active temporary credit card numbers, the temporary credit card number available for immediate use, after opening the credit card account, as payment in the Internet purchase transaction:

allow a plurality of additional Internet based purchases based on the temporary credit card number until the temporary credit card number is deactivated; and deactivate the temporary credit card number, wherein the software program is structured to cause the microprocessor to deactivate the temporary credit card number in response to receiving a message indicative of a browser shut down from the Internet client device.

7. An apparatus for allowing a customer at an Internet client device to make Internet based purchases using a temporary credit card number, the apparatus comprising:

a network receiver operatively coupled to the Internet;

a network transmitter operatively coupled to the Internet;

a microprocessor in communication with the network receiver and the network transmitter; and a memory device in communication with the microprocessor, the memory device storing a software program capable of being executed by the microprocessor, the software program being structured to cause the microprocessor to:

receive a message indicative of a request to apply for a credit card account from the network receiver during an Internet purchase transaction;

transmit data indicative of an electronic credit card account application to the network transmitter during the Internet purchase transaction;

receive the application from the network receiver, the application including applicant data during the Internet purchase transaction;

verify the applicant data against a verification database during the Internet purchase transaction;

if the applicant data is verified during the Internet purchase transaction, open the credit card account and issue a temporary credit card number that is unique among a plurality of currently active temporary credit card numbers, the temporary credit card number available for immediate use, after opening the credit card account, as payment in the Internet purchase transaction;

allow a plurality of additional Internet based purchases based on the temporary credit card number until the temporary credit card number is deactivated; and deactivate the temporary credit card number, wherein the software program is structured to cause the microprocessor to deactivate the temporary credit card number in response to the Internet client device failing to respond to a communication request.

8. An apparatus for allowing a customer at an Internet client device to make Internet based purchases using a temporary credit card number, the apparatus comprising:

a network receiver operatively coupled to the Internet;

a network transmitter operatively coupled to the Internet;

a microprocessor in communication with the network receiver and the network transmitter; and a memory device in communication with the microprocessor, the memory device storing a software program capable of being executed by the microprocessor, the software program being structured to cause the microprocessor to:

receive a message indicative of a request to apply for a credit card account from the network receiver during an Internet purchase transaction;

transmit data indicative of an electronic credit card account application to the network transmitter during the Internet purchase transaction;

receive the application from the network receiver, the application including applicant data during the Internet purchase transaction;

verify the applicant data against a verification database during the Internet purchase transaction;

if the applicant data is verified during the Internet purchase transaction, open the credit card account and issue a temporary credit card number that is unique among a plurality of currently active temporary credit card numbers, the temporary credit card number available for immediate use, after opening the credit card account, as payment in the Internet purchase transaction;

allow a plurality of additional Internet based purchases based on the temporary credit card number until the temporary credit card number is deactivated, and deactivate the temporary credit card number, wherein the software program is structured to cause the microprocessor to deactivate the temporary credit card number in response to a predetermined number of items being purchased using the temporary credit card number.

* * * * *